J. GRAY.
Piers for Suspension Bridges.
No. 134,269. Patented Dec. 24, 1872.
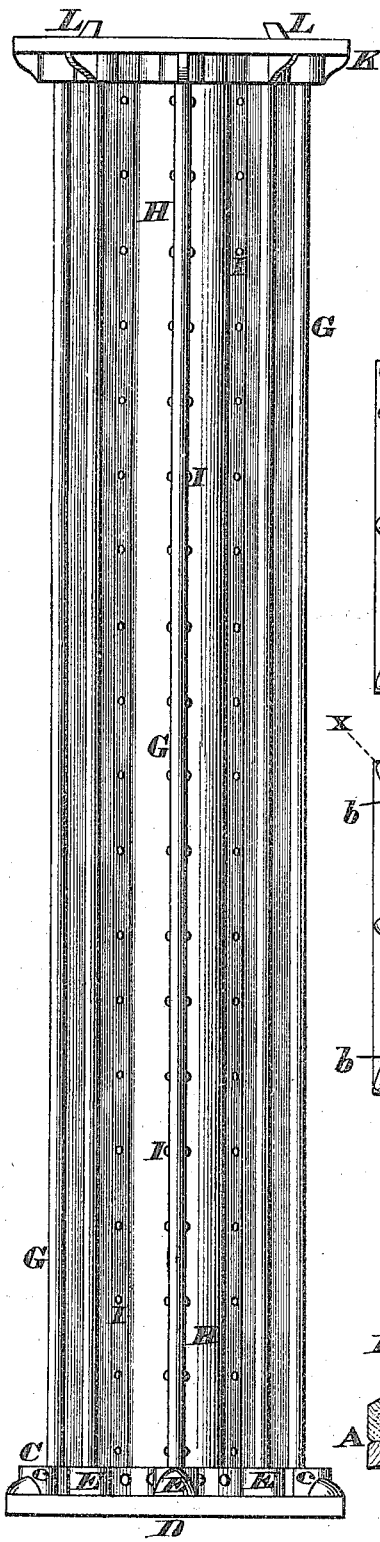
Fig. 1.
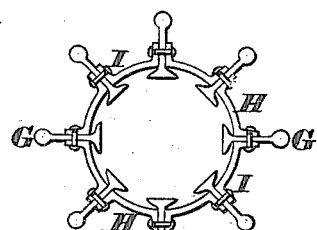
Fig. 2.
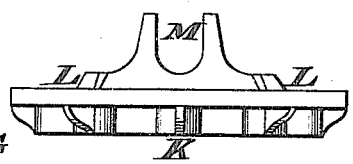
Fig. 7.
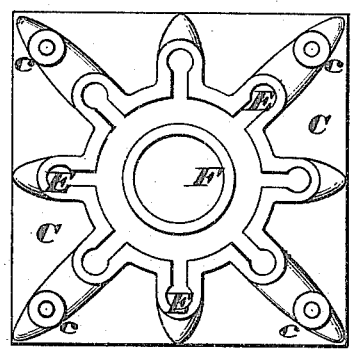
Fig. 3.
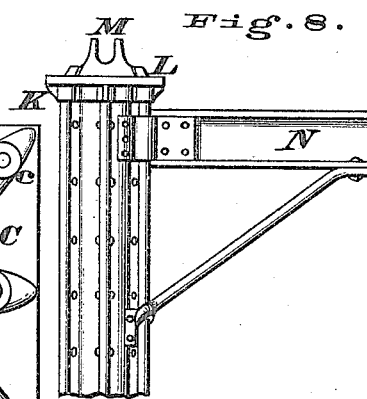
Fig. 8.
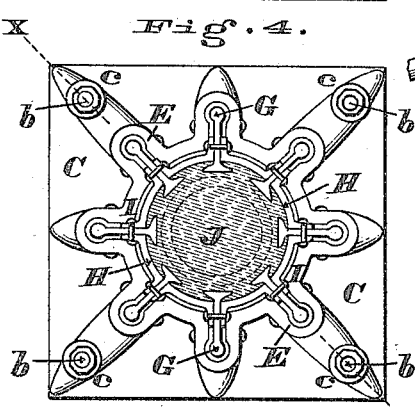
Fig. 4.
Fig. 6.
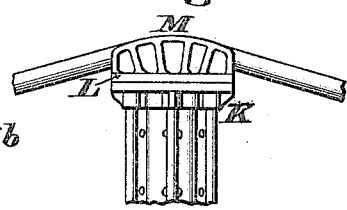
Fig. 9.
Fig. 5.
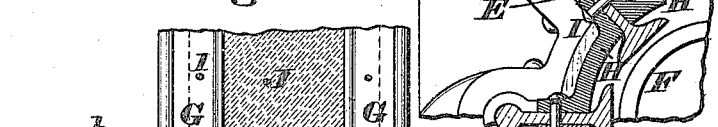
AM. PHOTO-LITHOGRAPHIC CO.N.Y. (OSBORNE'S PROCESS.)

UNITED STATES PATENT OFFICE.

JOHN GRAY, OF CINCINNATI, OHIO.

IMPROVEMENT IN PIERS FOR SUSPENSION BRIDGES.

Specification forming part of Letters Patent No. 134,269, dated December 24, 1872.

*To all whom it may concern:*

Be it known that I, JOHN GRAY, of Cincinnati, Hamilton county, Ohio, have invented an Improvement in Suspension Bridges, of which the following is a specification:

*Nature and Object of the Invention.*

My improvements relate wholly to the piers or columns which uphold the cables of a suspension bridge; and my invention consists in constructing such piers of the hereinafter-described wrought-iron tubes or columns, the same being filled with cement, and firmly secured in cast-iron steps and capitals, as hereinafter explained and set forth.

*Description of the Accompanying Drawing.*

Figure 1 is an elevation of a bridge-column embodying my improvements. Fig. 2 is a transverse section of the same. Fig. 3 is a plan of the cast-iron base, into which the column is anchored. Fig. 4 is a horizontal section, showing the column anchored into the base and filled with concrete. Fig. 5 is an enlarged view of a portion of the bed-plate and column, the latter being sectioned. Fig. 6 is a vertical section through the lower portion of the column and its accessories, the section being taken diagonally of the base-plate at the line X X, Fig. 4. Fig. 7 represents the cap of the column with the saddle attached thereto. Fig. 8 shows the manner of attaching the girder that unites the two contiguous columns of the bridge; and Fig. 9 is a side elevation, showing the saddle in position upon the columns and a portion of the supporting-cable resting within said saddle.

Of the above illustrations Fig. 5 is drawn on an enlarged scale, while Figs. 8 and 9 are drawn on a reduced scale.

Built within a suitable foundation, A, of masonry, are four or more anchor-bolts, B, whose heads *b* occupy sockets *c* in a cast-iron step or bed-plate, C, which may consist of plinth D, surmounted by a connected circular congeries of U-formed bosses, E, which open inwardly, and concentrically within these an annular curb or fillet F. This circle of bosses E constitutes a step or socket for the foot of a wrought-iron shaft or column of the following construction: G are a congeries of wrought-iron plates of the represented form, approximating in their transverse section the letter T, which plates are connected, in the represented circular arrangement, by staves H and rivets I. Said staves may have the represented arc form, so as to constitute a cylinder, or may be flat, so as to impart a prismatical form to the column. The said foot of the column is secured in the described socket by lead or sulphur, or other suitable cement; and the entire interior of the column is filled with a solid grouting, J, of any suitable composition. I have used, and recommend for this purpose, the following composition: Roofing-pitch and coal-tar, equal parts, thoroughly mixed with equal parts of fine gravel and sharp sand, and a small addition of dry cement. The sand and gravel being thoroughly dried by heat, are added to the hot pitch in as large a proportion as possible, and the whole poured in hot and well tamped. The interior of the column is thus completely guarded from oxidation and rendered solid. The column thus placed and grouted is then surmounted by a cap, K, of cast-iron, so formed on its under side as to receive and embrace the top of the column, and having on its upper side dovetail projections L to receive and hold the saddle M, upon which the cable is laid. Before being united together, all the external parts of my pier are thoroughly protected by paint or other suitable coating. One or more thicknesses of woolen felt, P, thickest in the middle, so as to permit a slight rock of the piers on the cable's plane, may be introduced between the foundation and the bed-plate. Two or more columns may be grouped to form a single pier, if desired. The upper ends of the piers, at one end of the bridge, are suitably connected by a brace or girder, N.

In comparison with the customary piers of masonry, my described composite pier of wrought and cast iron and cement has several very important advantages—for example, the entire superstructure, being continuous and connected, cannot be separated at any part, or shaken down by winds or other external agencies. The pier being less than one-eighth the weight of what would be required in masonry, the foundation is relieved by that much. There being much less surface for the action of the wind, the bridge is safer. My composite pier can be constructed in less than one-fourth of the time, and at much less expense, than one of masonry.

A suspension bridge thus constructed almost entirely of metal has more architectural grace and harmony, and is much cheaper in construction, than one of the usual plan of construction having towers of masonry, and the weight upon the foundation is materially less, as above stated. All the principal parts of my superstructure being of metal, expand and contract under changes of temperature in exact geometrical proportion, so that no strain or disproportion of parts can ever occur from this cause.

*Claim.*

I claim as new and of my invention—

The described arrangement of step or bedplate C D E F, longitudinally-jointed columns G H I, grouting J, and cap K L, constituting a pier for suspension bridges.

In testimony of which invention I hereunto set my hand.

JOHN GRAY.

Witnesses:
 GEO. H. KNIGHT,
 JAMES H. LAYMAN.